July 8, 1941.   D. R. COTTERMAN   2,248,811
METHOD OF MANUFACTURING FLOOR COVERINGS
Filed April 18, 1938
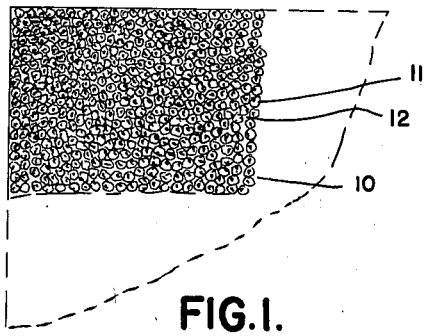
FIG.I.
FIG.2.
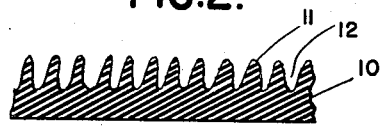
FIG.3.
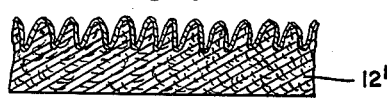
FIG.4.
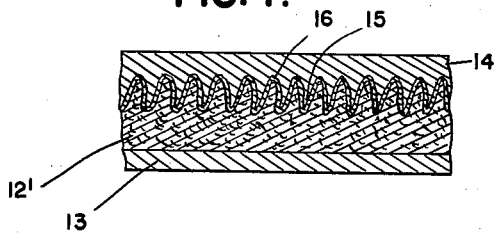
FIG.5.
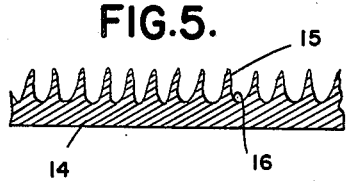
FIG.6.
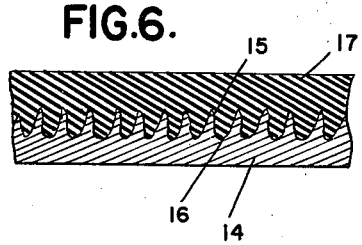
FIG.7.
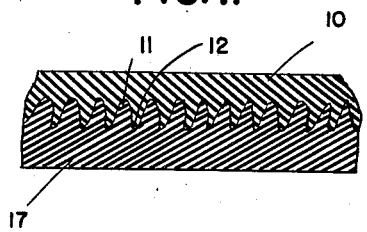
INVENTOR
DON. R. COTTERMAN
BY
ATTORNEYS Patented July 8, 1941

2,248,811

UNITED STATES PATENT OFFICE 2,248,811

METHOD OF MANUFACTURING FLOOR COVERINGS

Don R. Cotterman, Pontiac, Mich., assignor to Baldwin Rubber Company, Pontiac, Mich., a corporation of Michigan Application April 18, 1938, Serial No. 202,775

5 Claims. (Cl. 18—55)

This invention relates generally to floor coverings and refers more particularly to improvements in floor mats of the type formed of a vulcanizable material, such as rubber.

One of the principal objects of this invention is to provide a floor mat of vulcanizable material, such as rubber, having a tread surface simulating in appearance the tread surface of a selected fabric carpet or rug and capable of being inexpensively manufactured.

Another advantageous feature of this invention resides in the provision of a mat having projections and depressions forming a tread surface simulating in appearance the piles and interstices between the piles of a fabric carpet or rug.

In addition to the foregoing, the present invention contemplates a relatively simple and inexpensive method of forming the mat with a tread surface simulating the pile of a selected carpet or rug. In accordance with the present invention, the carpet having the desired pile is sprayed, or otherwise coated, with a solution characterized in that it possesses the quality of starching the pile to such an extent that the pile becomes very hard or stiff. In applying the solution, extreme care is taken that the interstices between the piles do not become filled with the solution. A molten metal having a melting point predetermined so that the temperature does not scorch the pile is poured over the piling of the carpet as quickly as possible and allowed to cool. As a result, a metal mold is formed of the carpet piling and the carpet is stripped from the mold after the latter has thoroughly cooled. The mold is then cleaned to remove any traces of the carpet piling that may have adhered to the metal and a hard rubber design plate is cured to the contour of the metal mold. The vulcanizable material from which the mat is formed is placed over the design plate or hard rubber mold and the exposed surface of the vulcanizable material is subjected to the action of fluid under pressure which is preheated to the temperature required to cure the vulcanizable material to the contour of the rubber mold.

With the foregoing, as well as other objects in view, the invention resides in the novel article and method of manufacture which will be made more apparent as this description proceeds, especially when considered in connection with the accompanying drawing, wherein:

Figure 1 is a fragmentary plan view of a mat manufactured in accordance with the present method and embodying the invention;

Figure 2 is an enlarged cross sectional view taken substantially on the plane indicated by the line 2—2 of Figure 1;

Figure 3 is an enlarged sectional view through a carpet illustrating the pile after the latter has been treated to stiffen or harden the piling;

Figure 4 is an enlarged sectional view illustrating the appearance of the pile after the molten metal has been poured over the same;

Figure 5 is an enlarged sectional view through the metal mold;

Figure 6 is an enlarged sectional view illustrating the hard rubber design plate on the metal mold; and Figure 7 is an enlarged sectional view illustrating the mat in position on the hard rubber design plate.

Referring now more in detail to the drawing and with special reference to Figures 1 and 2, it will be noted that the mat 10 comprises a sheet of vulcanizable material, such as rubber, having a tread surface formed with projections 11 and depressions 12. The projections 11 and depressions 12 cooperate to give the tread surface of the mat the appearance of ordinary fabric carpet piling. This imitation carpet piling on the tread surface of the mat not only gives the mat a pleasing appearance, but also imparts certain anti-skid qualities to the mat.

As stated above, the present invention contemplates a very simple and inexpensive method of manufacturing the mat 10. This method requires the minimum apparatus and the several steps thereof will be described in accordance with the sequence in which they are preferably effected. An ordinary fabric carpet 12' having a relatively short, coarse pile is selected and a solution capable of starching or hardening the pile is sprayed over the pile. While various different solutions may be employed for the above purpose, I have found that particularly satisfactory results are obtainable with a solution containing approximately 60% silicate of soda and 40% of a diluent, such as water. This solution is repeatedly sprayed over the pile of the fabric carpet until the pile is very hard, although the amount of the solution sprayed on the pile is carefully gauged so that the solution does not fill the interstices between the pile. The condition of the carpet subsequent to the spraying operation is shown somewhat exaggerated in Figure 3 in order to clearly illustrate that each individual pile is coated with the solution.

After the sprayed carpet has thoroughly dried, the undersurface of the latter is glued, or otherwise secured to a smooth, level surface 13 and a molten metal is poured over the pile in the manner clearly shown in Figure 4. Any metal may be used that has a melting point sufficiently low that it will not scorch or burn the pile and particularly satisfactory results have been secured by using a stereotype metal which will melt at approximately 150° F. The top surface of the metal is then surfaced and the metal is allowed to cool until it has become thoroughly set. The fabric carpet is then stripped from the resulting metal mold, designated in Figure 5 by the reference character 14, and the surface of the mold is cleaned in a manner to remove any portions of the carpet that may have adhered to the mold during the stripping operation.

As shown in Figures 5 and 6, the metal mold is provided with projections 15 and depressions 16 cooperating with the projections to simulate the pile of the carpet used. A sheet of uncured rubber is then placed on the contoured surface of the mold in the manner shown in Figure 6 and fluid under pressure is discharged onto the upper surface of the rubber sheet to force the opposite surface into intimate contacting relation with the metal mold throughout the area of the latter. The fluid under pressure is preferably preheated to a temperature sufficient to cure the sheet of rubber to the contour of the metal mold and, as a result, a hard rubber design plate or mold 17 is provided having a surface which also simulates in appearance the pile of the carpet.

The mats shown in Figure 1 are formed from the hard rubber mold 17, and this is accomplished in substantially the same manner employed in fashioning the hard rubber mold. In detail, a sheet of uncured rubber stock is placed over the contoured surface of the hard rubber mold and the top face of the sheet is subjected to the action of fluid under pressure. In actual practice, the hard rubber mold is supported in a pressure chamber and the fluid is admitted into the pressure chamber above the sheet of stock under sufficient pressure to force the underside of the sheet of stock into intimate contact with the contoured surface of the rubber mold throughout the area thereof. The fluid is preferably preheated to the temperature required to cure the sheet to the contour of the rubber mold. As a result, a mat of the type shown in Figures 1 and 2 is provided having a tread surface simulating in appearance the pile of an orthodox fabric carpet.

What I claim as my invention is:

1. Those steps in the method of producing a carpet design on the tread surface of a mat formed of vulcanizable material which consist in providing a strip of carpet of the required size and having pile on the tread surface, treating the tread surface of the strip to impart rigidity to the pile, applying a molten material over the tread surface of the carpet to form a matrix of said surface, stripping the carpet from the material after the latter has set, and curing a sheet of vulcanizable stock with one surface of the stock in intimate contacting relation with the contoured face of the matrix.

2. Those steps in the method of producing a carpet design on the tread surface of a mat formed of vulcanizable material which consist in providing a strip of carpet of the required size and having pile on the tread surface, coating the pile of the carpet with a solution rendering the pile relatively stiff, applying a molten metal having a melting point such that it will not scorch the pile over the treated tread surface of the carpet to form a matrix of the tread surface, removing the carpet from the matrix after the metal has set, and curing a sheet of vulcanizable material with one surface of the sheet in intimate contact with the contoured face of the matrix.

3. Those steps in the method of producing a carpet design on the tread surface of a mat formed of vulcanizable material which consist in providing a strip of carpet of the required size and having pile on the tread surface, coating the pile of the carpet with a solution rendering the pile relatively stiff, applying molten metal having a melting point such that it will not scorch the pile over the treated tread surface of the carpet to form a matrix of the tread surface, removing the carpet from the matrix after the metal has set, forming a hard rubber mold from the matrix, and curing a sheet of rubber with one surface of the sheet in intimate contact with the contoured surface of the hard rubber mold.

4. Those steps in the method of producing a carpet design on the tread surface of a mat formed of vulcanizable material which consist in providing a strip of carpet of the required size and having pile on the tread surface, coating the pile of the carpet with a solution rendering the pile relatively stiff, applying molten metal having a melting point such that it will not scorch the pile over the treated tread surface of the carpet to form a matrix of the tread surface, removing the carpet from the matrix after the metal has set, curing a hard rubber plate with one surface of the plate in intimate contact with the contoured face of the matrix, and curing a sheet of rubber material with one surface in intimate contact with the contoured face of the hard rubber plate.

5. Those steps in the method of producing a carpet design on the tread surface of a mat formed of vulcanizable material which consist in providing a strip of carpet of the required size and having pile on the tread surface, coating the pile with a solution of silicate of soda and a diluent to impart rigidity to the pile, pouring a molten material over the tread surface of the carpet to form a matrix of said surface, removing the carpet from the matrix, and curing a sheet of vulcanizable stock with one surface of the stock in intimate contact with the contoured face of the matrix.

DON R. COTTERMAN.